United States Patent
Kobayashi et al.

(10) Patent No.: US 11,752,966 B2
(45) Date of Patent: Sep. 12, 2023

(54) SIDE AIRBAG DEVICE

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 113 days.

(21) Appl. No.: 17/310,462

(22) PCT Filed: Dec. 23, 2019

(86) PCT No.: PCT/JP2019/050446
§ 371 (c)(1),
(2) Date: Aug. 4, 2021

(87) PCT Pub. No.: WO2020/162065
PCT Pub. Date: Aug. 13, 2020

(65) Prior Publication Data
US 2022/0126779 A1      Apr. 28, 2022

(30) Foreign Application Priority Data

Feb. 9, 2019   (JP) ................................. 2019-022181
Jul. 25, 2019  (JP) ................................. 2019-137328

(51) Int. Cl.
*B60R 21/231*      (2011.01)
*B60R 21/207*      (2006.01)
*B60R 21/233*      (2006.01)

(52) U.S. Cl.
CPC ...... *B60R 21/23138* (2013.01); *B60R 21/207* (2013.01); *B60R 21/233* (2013.01); *B60R 2021/23146* (2013.01)

(58) Field of Classification Search
CPC ............ B60R 21/23138; B60R 21/207; B60R 21/233; B60R 2021/23146; B60R 2021/23161; B60R 2021/23308
See application file for complete search history.

(56) References Cited

U.S. PATENT DOCUMENTS

2014/0062069 A1 *  3/2014  Fukawatase ...... B60R 21/23138
                                                        280/730.2
2014/0097601 A1 *  4/2014  Fukawatase .......... B60R 21/207
                                                        280/730.2
(Continued)

FOREIGN PATENT DOCUMENTS

DE    102013015141 A1 *  3/2015  ....... B60R 21/23138
JP       2008201172 A  *  9/2008
(Continued)

OTHER PUBLICATIONS

S. Hayashi, JP 2013-147041 Machine English Translation, ip.com (Year: 2013).*
(Continued)

*Primary Examiner* — Karen Beck
(74) *Attorney, Agent, or Firm* — Harness, Dickey & Pierce, P.L.C.; Stephen T. Olson

(57) ABSTRACT

The present invention is a side airbag device housed in the side support part of a vehicle seat and includes an airbag for restraining an occupant and an inflator. The airbag includes a first bag housing the inflator which is capable of inflating and deploying, and a second bag capable of inflating and deploying on the side of the first bag. The second bag is configured to be deployed by inflation gas flowing in from the first bag. At the upper edge of the second bag, an inclined part is formed that is inclined to be lower at the front thereof than at the rear thereof when viewed from the vehicle width direction. The front portion of the inclined part is configured
(Continued)

to be located lower than the center line extending in the longitudinal direction of the upper arm of the occupant seated in a vehicle seat.

17 Claims, 16 Drawing Sheets

(56) References Cited

U.S. PATENT DOCUMENTS

| | | | |
|---|---|---|---|
| 2014/0239618 A1* | 8/2014 | Katsumata | B60R 21/2342 280/728.3 |
| 2015/0061267 A1* | 3/2015 | Deng | B60R 21/26 280/730.2 |
| 2018/0050651 A1* | 2/2018 | Fukawatase | B60R 21/23138 |
| 2018/0186326 A1* | 7/2018 | Kobayashi | B60R 21/207 |
| 2019/0047504 A1* | 2/2019 | Sugishima | B60R 21/207 |
| 2019/0084516 A1* | 3/2019 | Fukawatase | B60R 21/2338 |
| 2021/0162942 A1* | 6/2021 | Kobayashi | B60R 21/233 |
| 2021/0276506 A1* | 9/2021 | Markusic | B60R 21/233 |
| 2022/0281402 A1* | 9/2022 | Kanayama | B60R 21/23138 |

FOREIGN PATENT DOCUMENTS

| | | | |
|---|---|---|---|
| JP | 2009-023494 A | 2/2009 | |
| JP | 2010-132072 A | 6/2010 | |
| JP | 2011-051414 A | 3/2011 | |
| JP | 2012-179956 A | 9/2012 | |
| JP | 2013-147041 A | 8/2013 | |
| JP | 2013-147119 A | 8/2013 | |
| JP | 2013-154786 A | 8/2013 | |
| JP | 2013147041 A * | 8/2013 | |
| JP | 2013-216211 A | 10/2013 | |
| JP | 2017-197017 A | 11/2017 | |
| WO | 2015/036116 A1 | 3/2015 | |
| WO | 2017/209192 A1 | 12/2017 | |
| WO | WO-2017209192 A1 * | 12/2017 | B60N 2/42 |
| WO | WO-2018179850 A1 * | 10/2018 | B60R 21/207 |
| WO | WO-2019244493 A1 * | 12/2019 | B60R 21/207 |

OTHER PUBLICATIONS

Y. Kobayashi, WO 2018/17850 Passenger protection device, English Machine translation, ip.com (Year: 2018).*

* cited by examiner

[FIG. 1]

[FIG. 3]
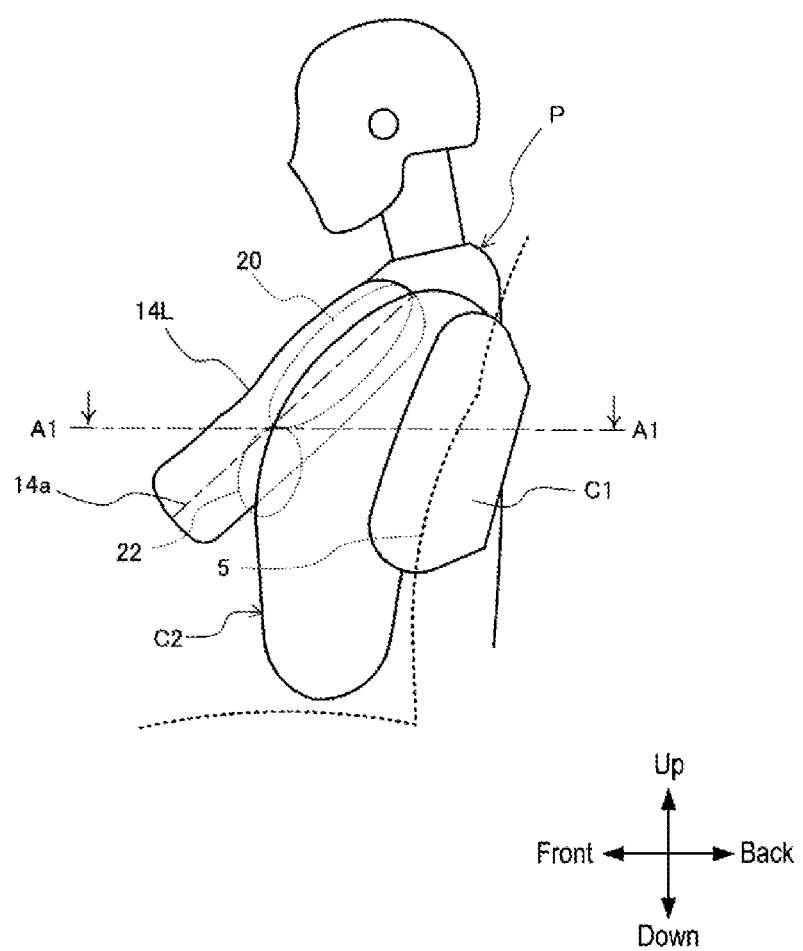

[FIG. 4]
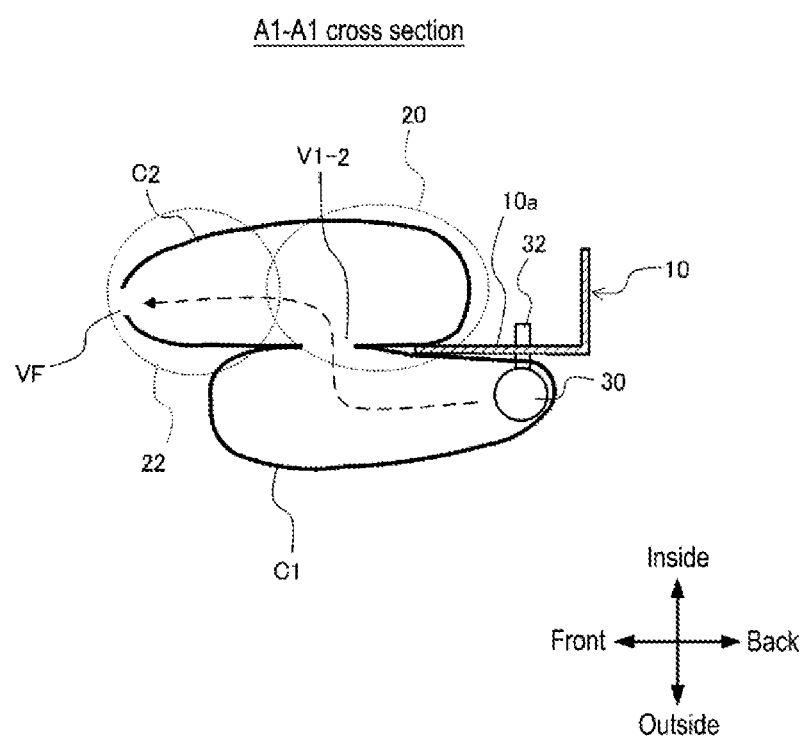

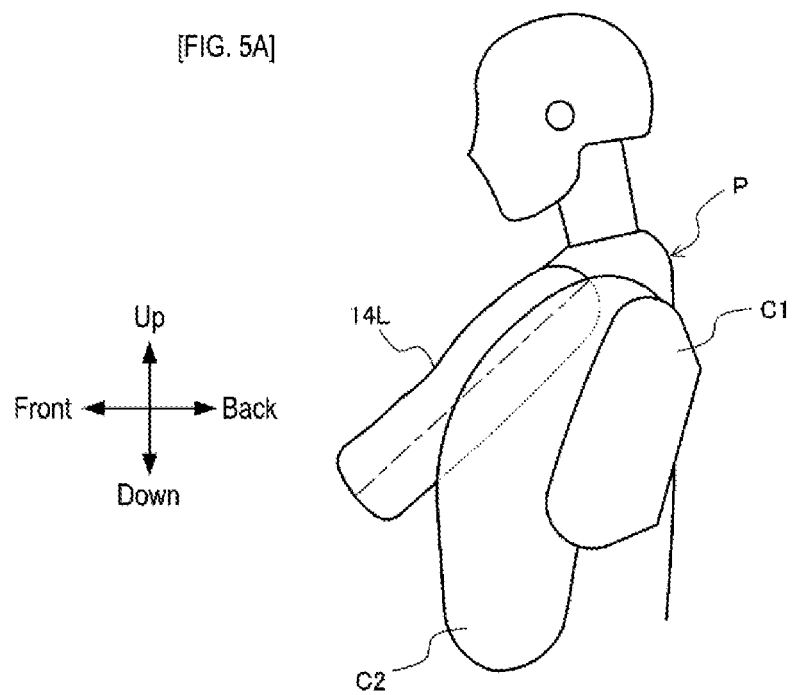
[FIG. 5A]
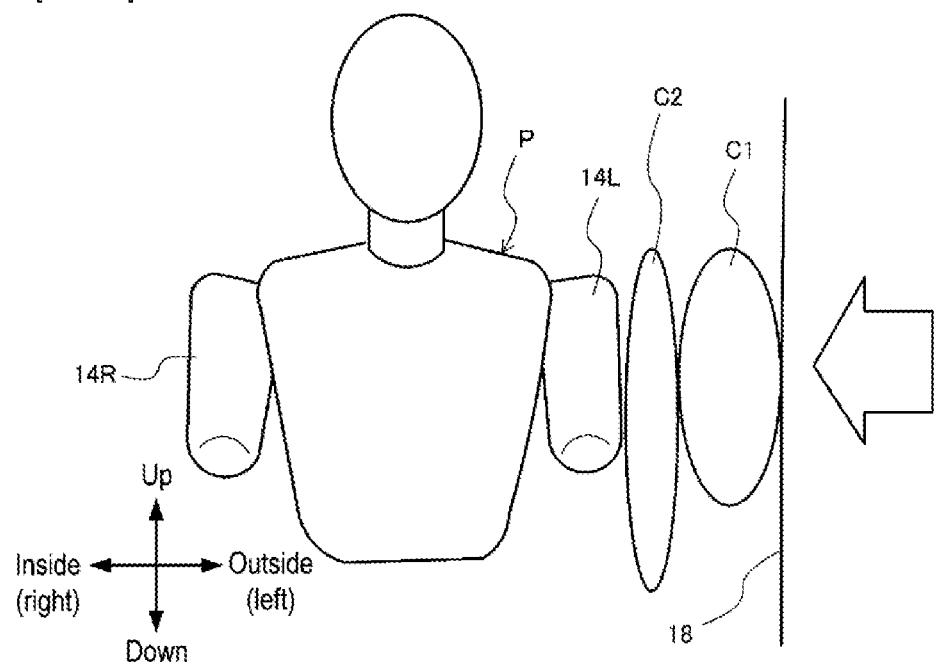
[FIG. 5B]

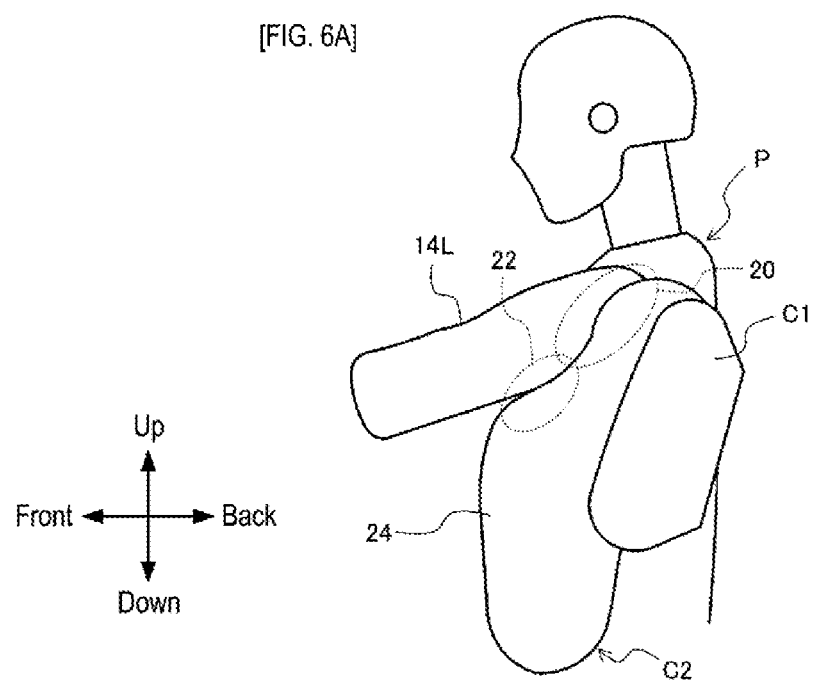
[FIG. 6A]
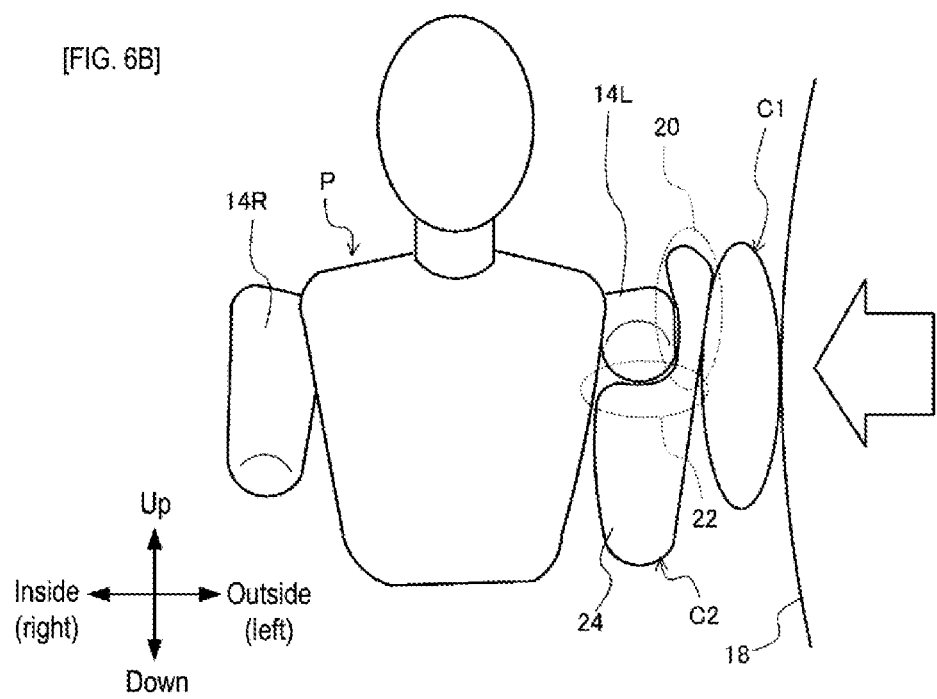
[FIG. 6B]

[FIG. 7]
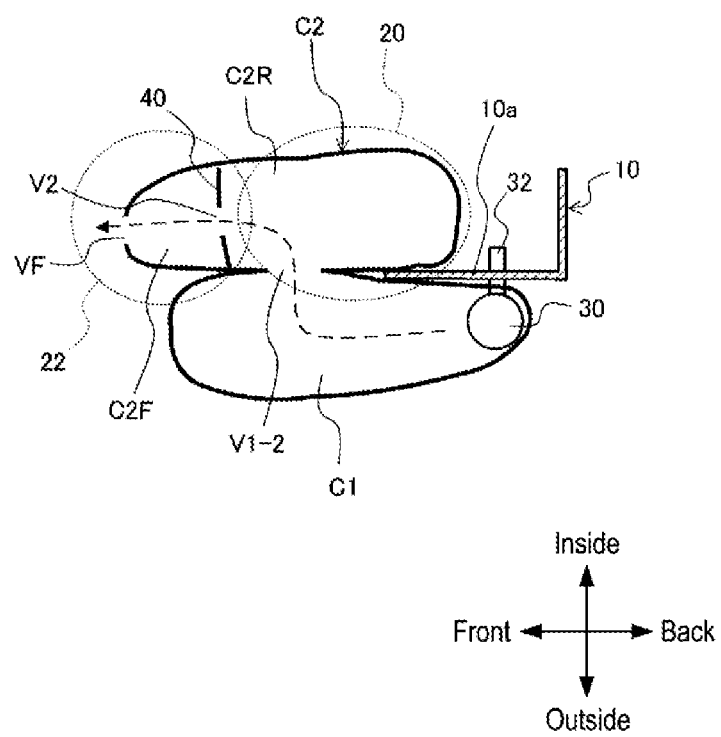

[FIG. 8]
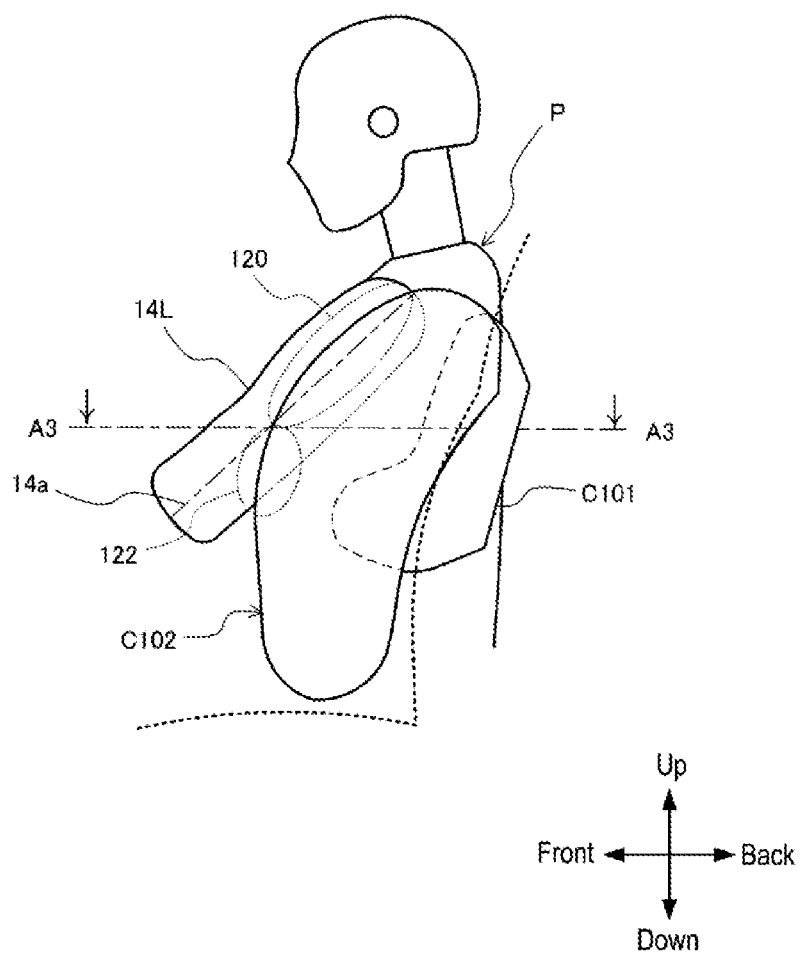

[FIG. 9]
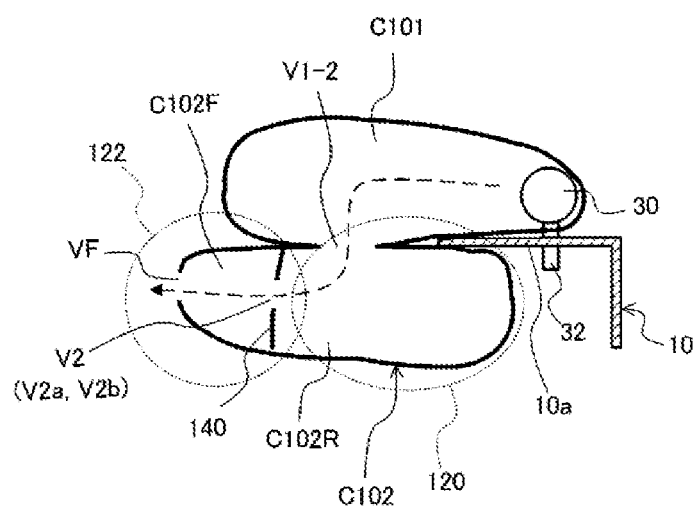
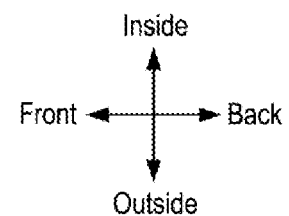

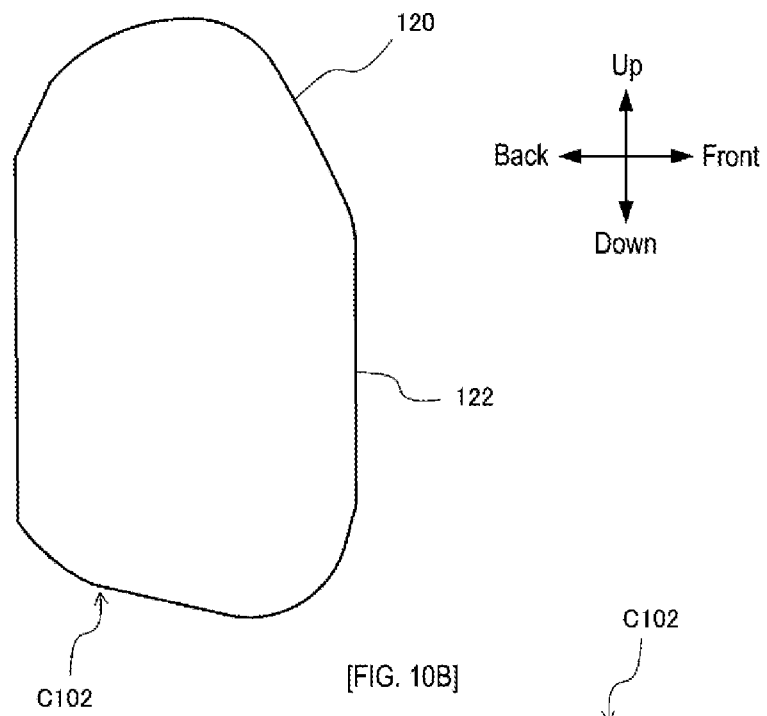
[FIG. 10A]
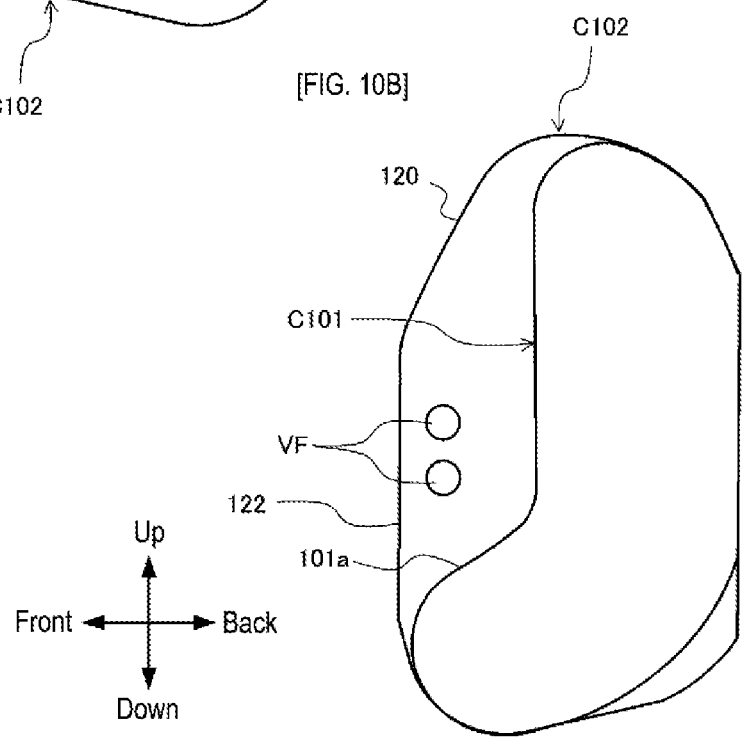
[FIG. 10B]

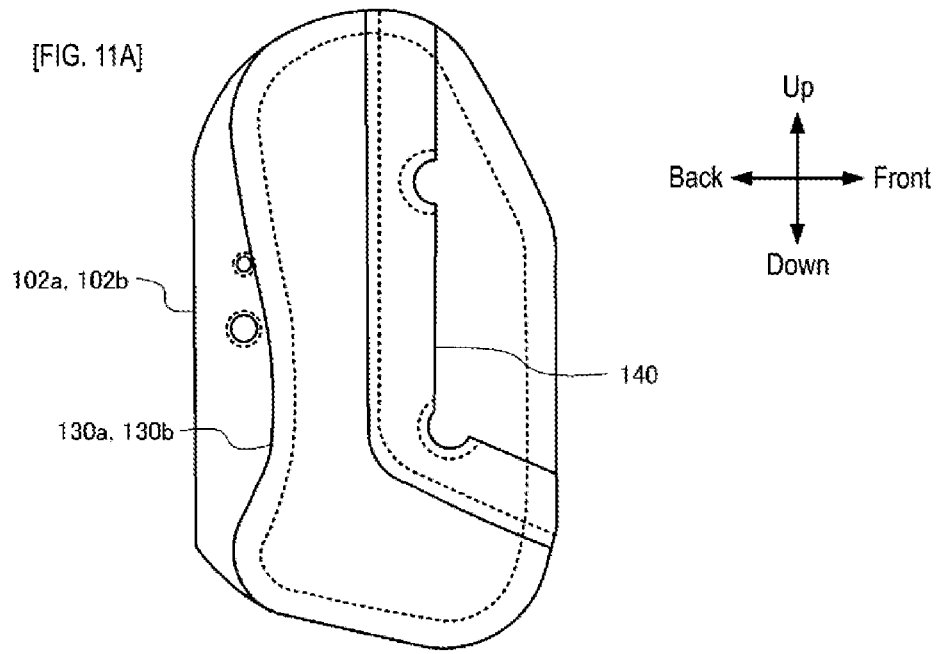
[FIG. 11A]
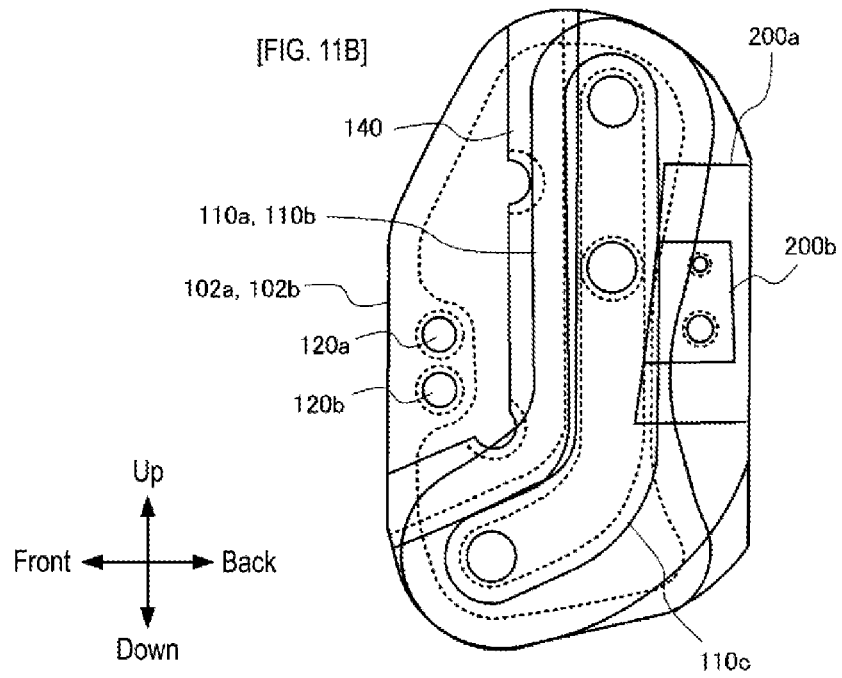
[FIG. 11B]

[FIG. 12]
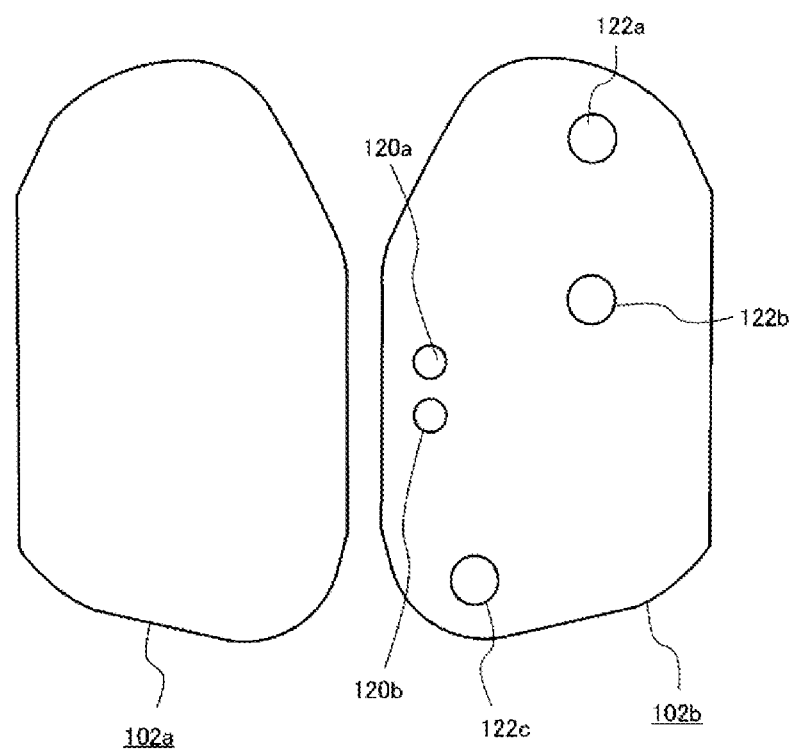

[FIG. 13A]
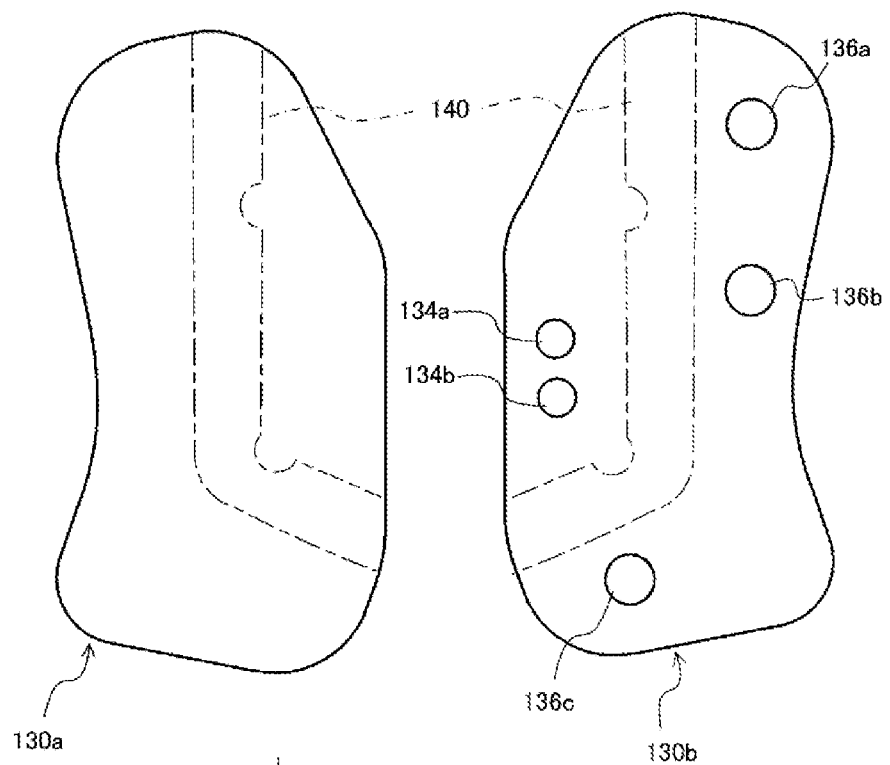
[FIG. 13B]
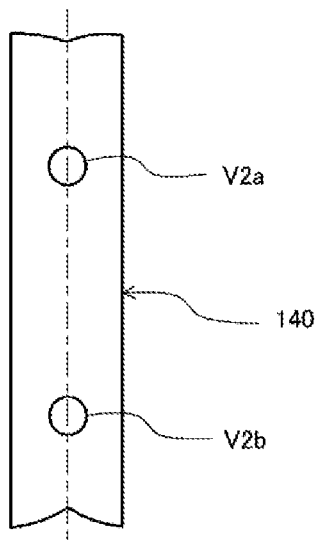

[FIG. 14A]
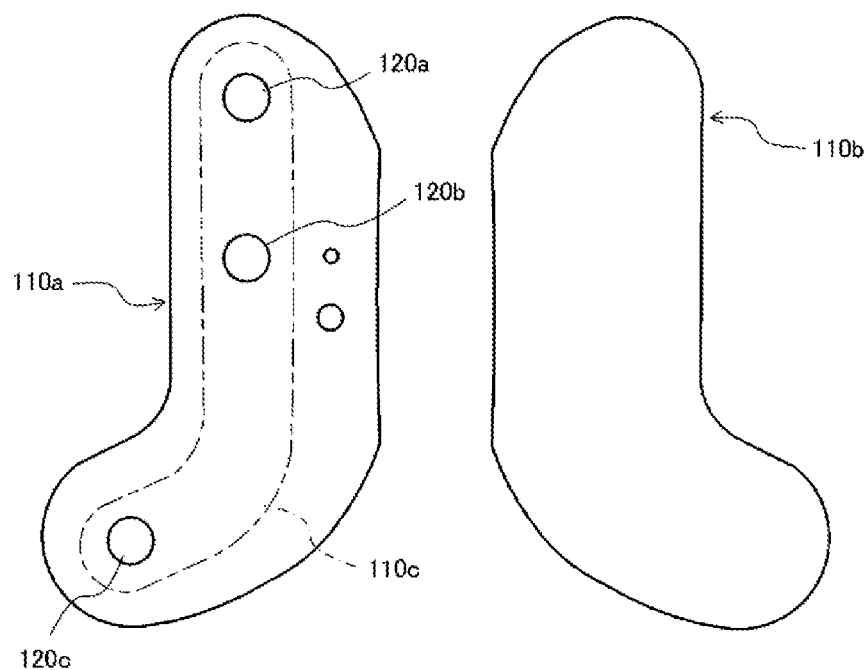
[FIG. 14B]
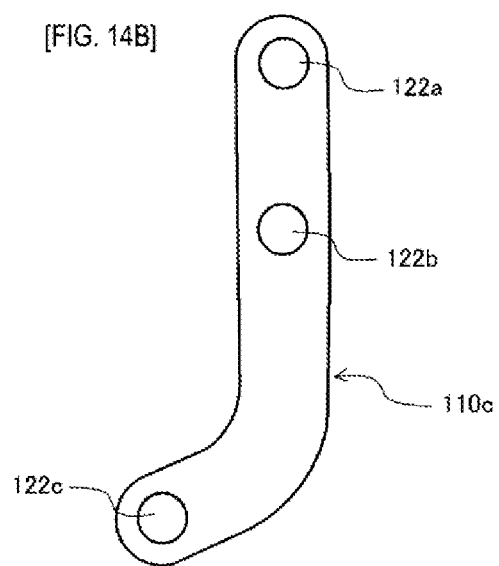

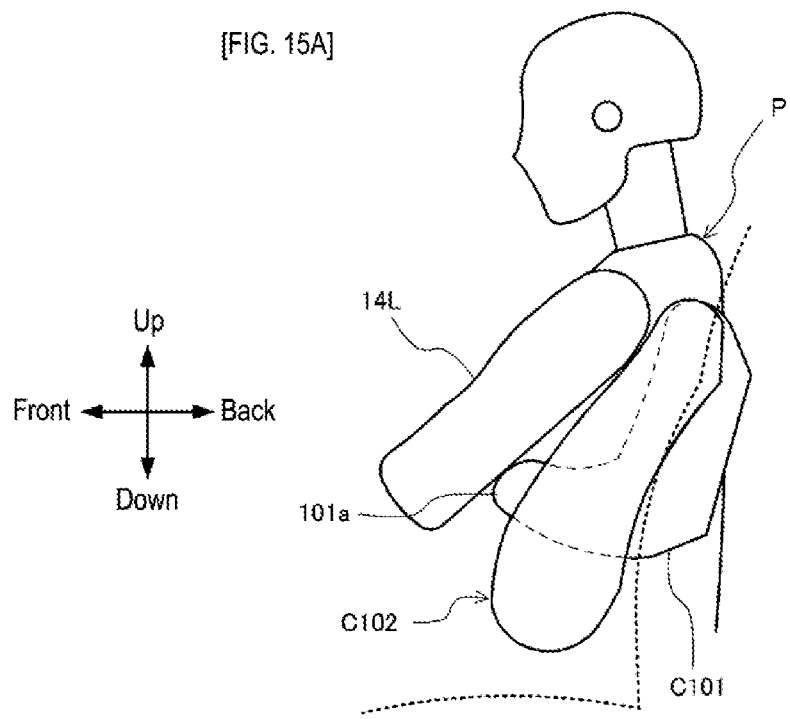
[FIG. 15A]
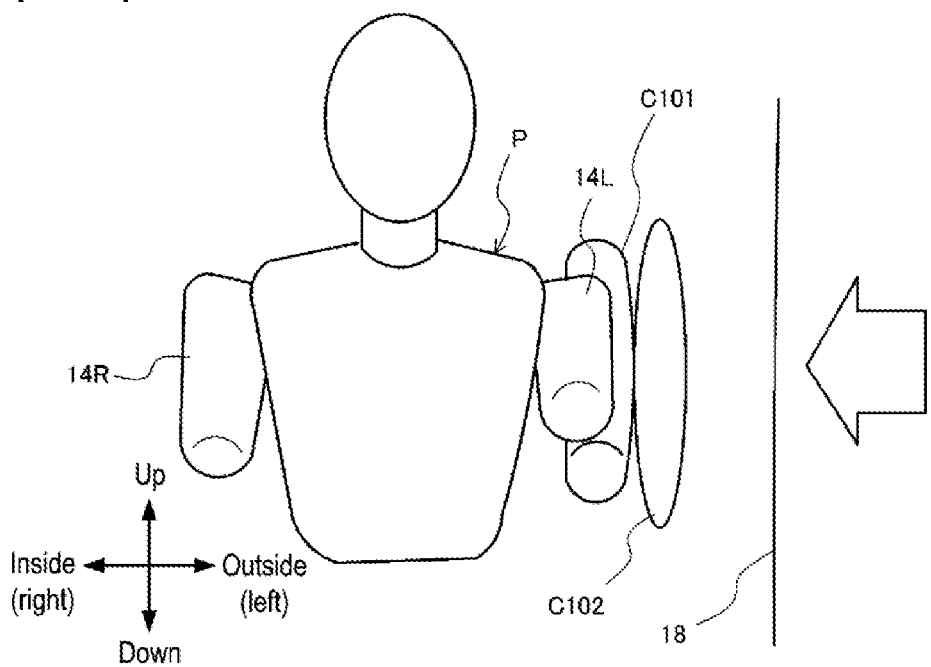
[FIG. 15B]

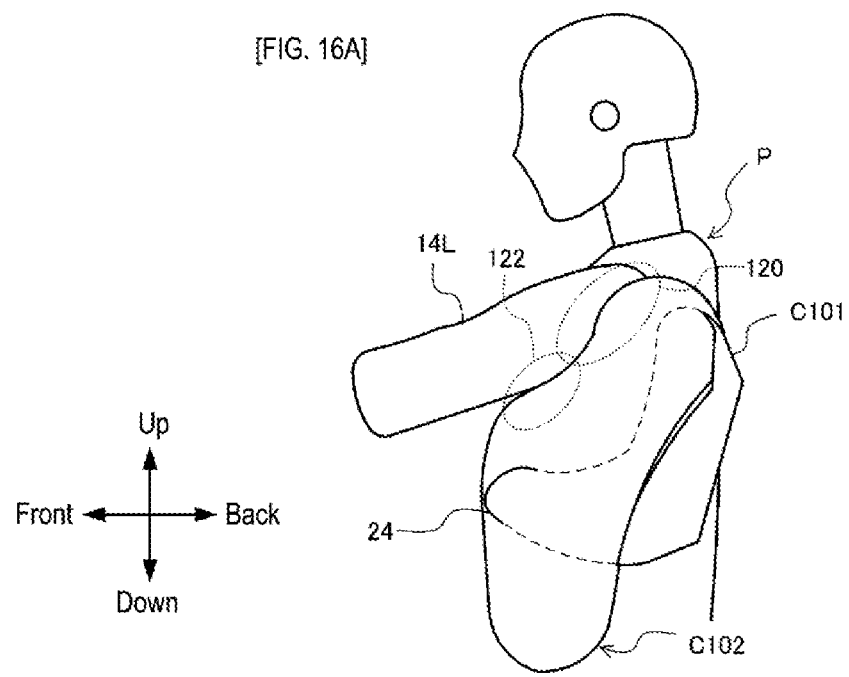
[FIG. 16A]
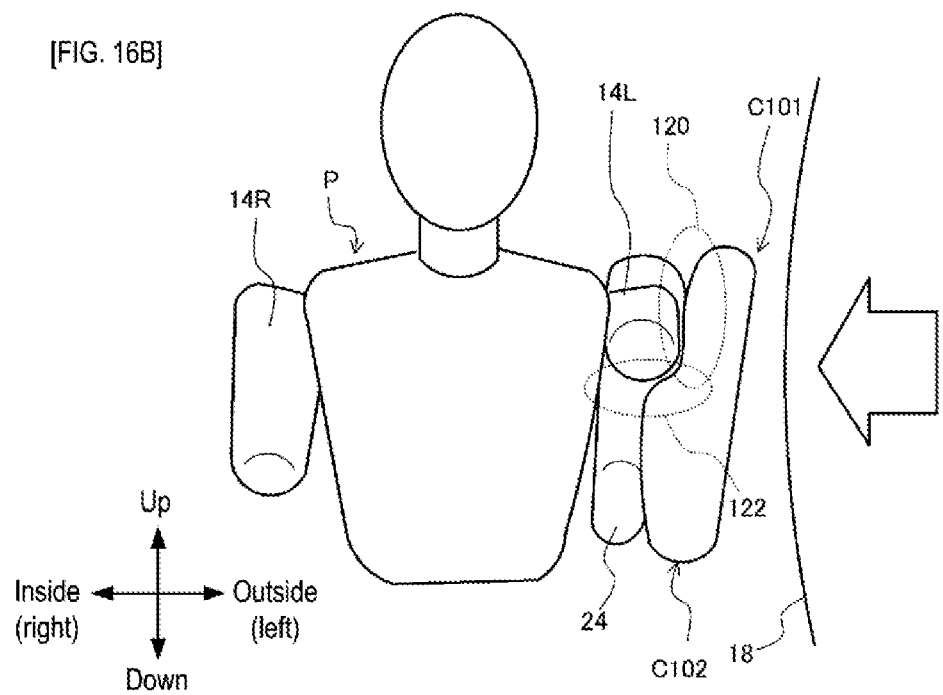
[FIG. 16B]

SIDE AIRBAG DEVICE

TECHNICAL FIELD

The present invention relates to a side airbag device that deploys on the side of a vehicle seat in order to protect the occupant thereof.

BACKGROUND TECHNOLOGY

The provision of a vehicle with one or more airbags in order to protect the occupants thereof in the event of a vehicle accident is well known. There are various forms of airbags, including, for example, what is referred to as a driver airbag that deploys from the vicinity of the center of the steering wheel of an automobile in order to protect the driver, a curtain airbag that deploys downward inside the window of the automobile in order to protect the occupants thereof in the event of an impact in the vehicle lateral direction or in the event of an overturn or rollover accident, and a side airbag that deploys on the side of a seat in order to protect the occupant thereof in the event of an impact in the vehicle lateral direction. The present invention relates to a side airbag device provided in a vehicle seat.

The side airbag device described in the following Patent Document 1 includes a primary airbag and an auxiliary airbag. Furthermore, the auxiliary airbag is caused to inflate and deploy prior to the primary airbag in order to restrain an occupant early on. In addition to the invention described in Patent Document 1, a side airbag device has been proposed that includes an auxiliary airbag in addition to a primary airbag.

Incidentally, with a side airbag device, the upper arm or elbow of an occupant may be caught between an airbag expanded and deployed from the side support part of a seat and the chest (rib bones) of the occupant. That is, in the event of a vehicle side collision, the vehicle side is dented, while the door trim or the like penetrates the vehicle cabin. In this case, the arm of the occupant may be caught between his/her chest and an inflated side airbag, with the arm potentially pressed against the chest and leading to the possibility of injury to the chest.

In order to solve the problem as described above, a side airbag device is proposed that causes the airbag to slip under the upper arm (under the armpit) of the occupant, thereby flipping up the arm of the occupant. In such type of side airbag device that flips up (lifts) the arm of the occupant, the airbag is pushed in (pressed) toward the occupant side, utilizing, for example, the impact exerted on the vehicle door. However, utilizing the deformation of the door trim makes it difficult to quickly lift the arm of the occupant, because the airbag moves to the occupant side after a certain period of time has elapsed from the occurrence of a side collision.

Furthermore, if the arm of the occupant is strongly flipped up by the side airbag, the occupant injury value may potentially be increased by the flipping up of the arm per se. Furthermore, the shoulder of the occupant may potentially be insufficiently protected when a structure is employed that causes the airbag to slip under the arm (under the armpit) of the occupant.

PRIOR ART DOCUMENTS

Patent Documents

Patent Document 1: Japanese Unexamined Patent Application Publication No. 2009-023494

SUMMARY OF THE INVENTION

Problem to be Solved by the Invention

The present invention has been created in view of the circumstances as described above, and an object thereof is to provide a side airbag device capable of preventing excessive force from being exerted on the chest of an occupant by an airbag.

Another object of the present invention is to provide a side airbag device capable of quickly performing a motion to lift the arm of the occupant via an airbag.

Yet another object of the present invention is to provide a side airbag device capable of preventing excessive force from being exerted on the chest of an occupant by an airbag without compromising a function to protect the vicinity of a shoulder of the occupant.

Means for Solving the Problems

In order to solve the problems described above, the present invention provides a side airbag device that is housed in the side support part of a vehicle seat and includes an airbag for restraining the occupant thereof by inflating and deploying and an inflator for supplying inflation gas to the airbag. The airbag includes a first bag housing the inflator on the inside thereof and capable of inflating and deploying along with a second bag capable of inflating and deploying on the side of the first bag. The second bag is configured so as to be deployed by inflation gas flowing in from the first bag. An inclined part that is inclined so as to be lower at the front thereof than at the rear thereof when viewed from the vehicle width direction (lateral direction) is formed at the upper edge of the second bag. Furthermore, the front portion of the inclined part is configured so as to be located lower than the center line extending in the longitudinal direction of the upper arm of the occupant seated in the vehicle seat, thereby forming a first protection area that slides in under the upper arm of the occupant.

In the present invention as described above, the inclined part that is lower toward the front thereof is formed at the upper edge of the second bag, while the front portion of the inclined part is located lower than the center line extending in the longitudinal direction of the upper arm of the occupant seated in the vehicle seat, thereby forming a first protection area that slides in under the upper arm of the occupant; therefore, the upper arm of the occupant is lifted upward when the airbag deploys. As a result, it is possible to avoid damage caused by the arm of the occupant being caught between the inflated airbag and the chest of the occupant. Furthermore, since the airbag includes the first bag and the second bag, the first bag that deploys earlier than the second bag can assist in the motion by which the arm of the occupant is lifted by the second bag. That is, it is possible for the first bag to push in the second bag toward the occupant side or slightly lift the upper arm of the occupant by the first airbag in the initial stage of deployment of the airbag.

According to a first aspect of the present invention, the inflator is disposed outside in the vehicle width direction relative to the side frame in the side support part, while the second bag can be configured so as to deploy outside in the vehicle width direction of the first bag.

The first bag preferably deploys so as to abut between the second bag and the side structure of the vehicle during the initial stage of deployment of the airbag.

The first bag preferably deploys so as to abut between the second bag and the side structure prior to the second bag fully deploying.

The first bag is preferably configured so as to deploy between the side frame and the side structure, utilizing the reaction force of the side frame, during the initial stage of deployment of the airbag.

In the side airbag device of the structure as described above, the first bag is disposed outside the side frame of the seat, while the first bag deploys so as to fill between the airbag and the door trim (the side structure); consequently, when the door trim deforms and is pushed in toward the occupant side under the impact of a side collision, it is possible to quickly transfer the pressure to the second bag through the deployed first bag. As a result, it is possible for the second bag to quickly restrain the occupant. Meanwhile, the inclined part that is inclined so as to be lower at the front thereof than at the rear thereof is formed at the upper edge of the second bag, while the front portion of the inclined part is structured so as to be located lower than the center line extending in the longitudinal direction of the upper arm of the occupant seated in the vehicle seat, thereby forming a first protection area that slides in under the upper arm of the occupant; therefore, it is possible to gradually lift the upper arm of the occupant without rapidly flipping it up.

According to a second aspect of the present invention, the inflator is disposed inside in the vehicle width direction relative to the side frame in the side support part, while the second bag can be configured so as to deploy outside in the vehicle width direction of the first bag.

The first bag preferably deploys between the second bag and the occupant during the initial stage of deployment of the airbag.

The first bag preferably deploys so as to slip under the arm of the occupant in the initial stage of deployment of the airbag.

The first bag can be configured so as to deploy utilizing the reaction force of the side frame.

In any aspect of the present invention, the rear portion of the inclined part can be located higher than the center line extending in the longitudinal direction of the upper arm of the occupant seated in the vehicle seat, to form a second protection area for protecting the shoulder of the occupant when the airbag deploys.

The airbag can be shaped such that the capacity of the second bag is relatively greater than that of the first bag. By having the capacity of the first bag small, the first bag is quickly fully deployed by inflation gas output from the inflator, and in the first aspect, it is possible to instantaneously fill between the vehicle seat (side frame) and the side structure, such as the door trim, with the first bag, while in the second aspect, it is possible to quickly move the occupant in a direction away from the door trim by the first airbag.

The boundary portion between the first bag and the second bag can be made into a structure having a first inner vent hole formed therein.

Preferably, the second bag is partitioned into a front chamber portion and a rear chamber portion, the partitioned portions are configured so as to be provided with a second inner vent hole such that inflation gas flows from the rear chamber portion into the front chamber portion, the front chamber portion is configured so as to form the first protection area, and the rear chamber portion is configured so as to form the second protection area.

When the second bag is partitioned into the front chamber portion and the rear chamber portion, the rear chamber portion deploys earlier, allowing the shoulder of the occupant to be protected in the initial stage of deployment of the airbag and the lateral movement of the occupant to be quickly restrained. Meanwhile, the front chamber portion deploys following the rear chamber portion, thereby allowing the upper arm of the occupant to be lifted at relatively gradual timing without rapidly flipping up the upper arm of the occupant by the second bag (the first protection area).

Furthermore, compared with other side airbags having equivalent capacities, the side airbag of the present invention is devised in the order of deployment such that the first bag deploys early, after which the second bag deploys, with the time required to complete deployment of the airbag being equivalent. Therefore, it is possible to ensure a time margin for locating (moving) the occupant to a safer area within a short collision time.

The occupant may be assumed to be based on, for example, a World Side Impact Dummy (W-SID). In other words, the side airbag device according to the present invention can be configured based on the arms and shoulders of the dummy.

BRIEF DESCRIPTION OF THE DRAWINGS

FIG. 3 is a schematic side view of a side airbag device according to a first example of the present invention, illustrating the state of a deployed airbag viewed from outside (from the door trim side) in the vehicle width direction.

FIG. 4 is a schematic view illustrating the deployed state of the airbag device according to the first example of the present invention, corresponding to the cross section along line A1-A1 in FIG. 3.

FIG. 5 is a side view (A) and a front view (B) illustrating the deployed state (initial deployment) of the airbag device according to the first example of the present invention.

FIG. 6 is a side view (A) and a front view (B) illustrating the deployed state (full deployment) of the airbag device according to the first example of the present invention.

FIG. 7 is a schematic view illustrating the deployed state of an airbag device according to a second example of the present invention, corresponding to the cross section along line A-A in FIG. 3.

FIG. 8 is a schematic side view of a side airbag device according to a third example of the present invention, illustrating the state of a deployed airbag viewed from outside (from the door trim side) in the vehicle width direction.

FIG. 9 is a schematic view illustrating the deployed state of the airbag device according to the third example of the present invention, corresponding to the cross section along line A3-A3 in FIG. 8.

FIG. 10 is a side view schematically illustrating the shape of the airbag (in a deployed state) according to the third example of the present invention, wherein (A) is a view from the door side in the vehicle width direction, while (B) is a view from the occupant side.

FIG. 11 is a perspective side view illustrating the panel structure of the airbag according to the third example of the present invention, wherein (A) is a view from the door side in the vehicle width direction, while (B) is a view from the occupant side.

FIG. 12 is a plan view illustrating the panel structure of the airbag according to the third example of the present invention, illustrating a pair of left and right panels that constitute a second bag.

FIG. 13 is a plan view illustrating the panel structure of the airbag according to the third example of the present invention, wherein (A) and (B) illustrate a pair of left and right reinforcing panels provided inside the first bag, while (B) illustrates a panel partitioning between the front and rear chambers of the second bag.

FIG. 14 is a plan view illustrating the panel structure of the airbag according to the third example of the present invention, wherein (A) and (B) are a pair of left and right panels constituting a first bag, while (B) is a reinforcing panel stitched between the first bag and the second bag.

FIG. 15 is a side view (A) and a front view (B) illustrating the deployed state (initial deployment) of the airbag device according to the third example of the present invention.

FIG. 16 is a side view (A) and a front view (B) illustrating the deployed state (full deployment) of the airbag device according to the third example of the present invention.

MODE FOR CARRYING OUT THE INVENTION

Figure 1:
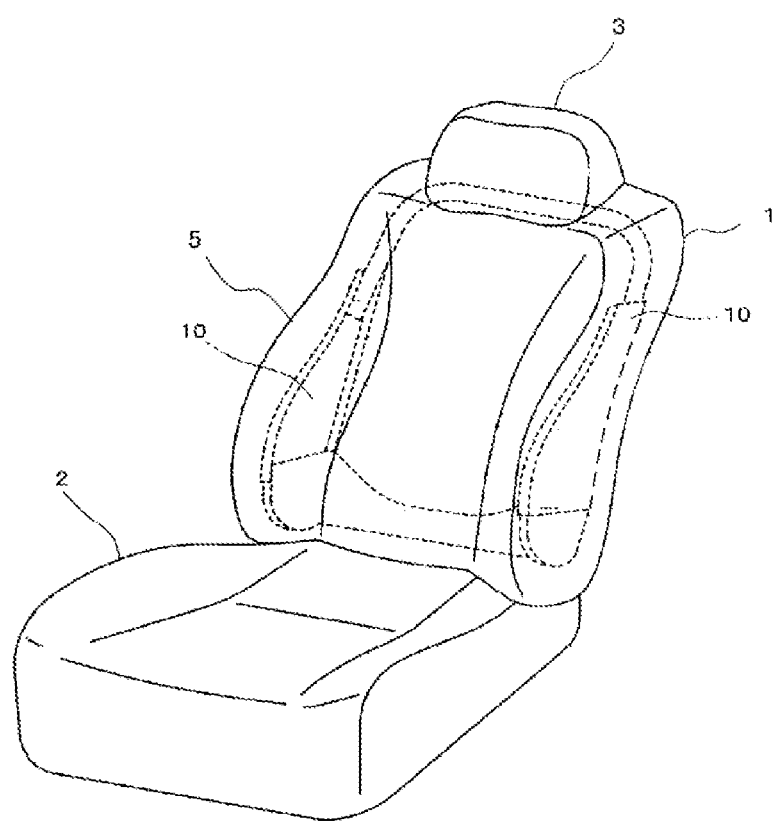
FIG. 1 is a perspective view illustrating mainly the external shape of a vehicle seat used for the side airbag device according to the present invention, wherein no airbag unit is illustrated.

The side airbag device according to the present invention will be described with reference to the accompanying drawings. Note that "front" indicated in the drawings indicates the front side (in the traveling direction) of a vehicle, "rear" indicates the rear of the vehicle (side opposite the traveling direction), "inside" indicates the inner side in the vehicle width direction (occupant side), and "outside" indicates the outer side in the vehicle width direction (door panel side).

Furthermore, in examples of the present invention, an explanation will be provided for cases in which a side airbag device is designed assuming an occupant P based on an experimental dummy. Note that while the present invention is not limited to a specific experimental dummy for design, in the examples of the present invention, an explanation will be provided for the case in which the experimental dummy is based on WSID (World Side Impact Dummy) as an example.

Figure 2:
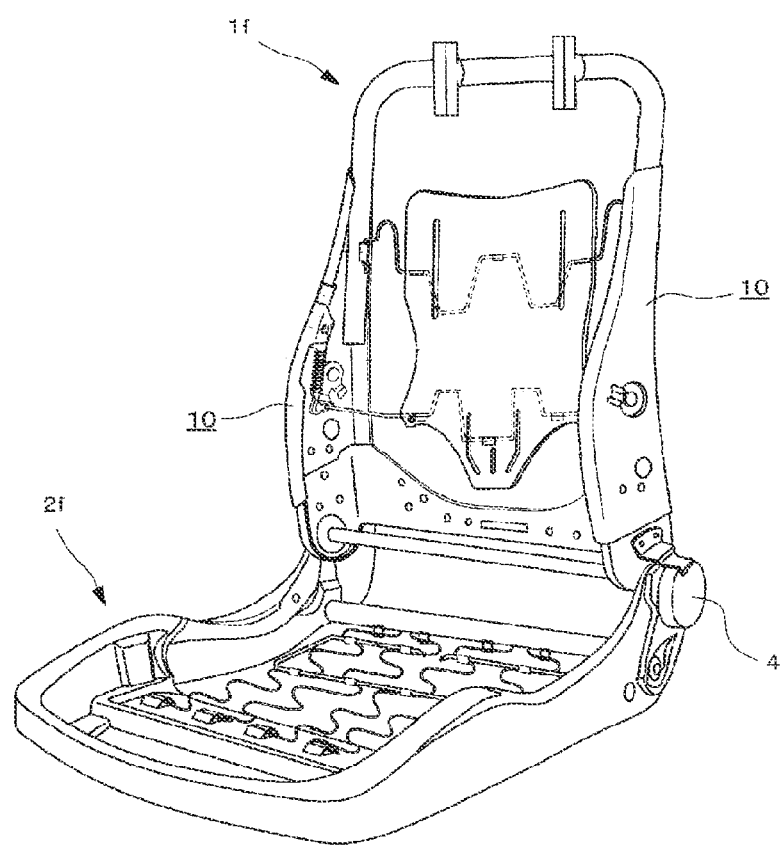
FIG. 2 is a perspective view illustrating the internal structure (seat frame) that functions as the framework of the vehicle seat illustrated in FIG. 1, wherein no airbag unit is illustrated.

FIG. 1 is a perspective view illustrating mainly the external shape of a vehicle seat used for a side airbag device according to a first example of the present invention, wherein no airbag device is illustrated. FIG. 2 is a perspective view illustrating the internal structure (seat frame) that functions as the framework of the vehicle seat illustrated in FIG. 1, wherein no airbag device is illustrated either.

As illustrated in FIG. 1 and FIG. 2, from the viewpoint of components, a vehicle seat according to this example is composed of a seat cushion 2, or a portion for an occupant to sit on, a seat back 1 forming a backrest, and a headrest 3 connected to the upper end of the seat back 1.

A seat back frame 1f that forms the framework of the seat is provided inside the seat back 1, a pad made of urethane foam or the like is provided on the surface and periphery thereof, and the surface of the pad is covered by a skin 14, such as leather or fabric. A seating frame 2f is disposed on the bottom side of the seat cushion 2 and a pad made of urethane foam or the like is provided on the top surface and periphery thereof, with the surface of the pad covered by a skin (not illustrated), such as leather or fabric. The seating frame 2f and the seat back frame 1f are connected via a reclining mechanism 4.

As illustrated in FIG. 2, the seat back frame 1f is configured into a frame shape by side frames 10 disposed laterally spaced apart and extending in the vertical direction, an upper frame connecting the upper ends of the side frames 10, and a lower frame connecting the lower ends thereof. The headrest 3 is configured by providing a cushioned component outside a headrest frame.

FIG. 3 is a schematic side view of a side airbag device according to the present invention, illustrating the state of a deployed airbag viewed from outside (from the door trim side) in the vehicle width direction. FIG. 4 is a schematic view illustrating the deployed state of the airbag device according to the first example of the present invention, corresponding to the cross section along line A1-A1 in FIG. 3.

The present invention is a side airbag device that is housed in a side support part 5 of a vehicle seat and comprises airbags C1, C2 for restraining an occupant by inflating and deploying, along with an inflator 30 disposed outside in the vehicle width direction relative to the side frame 10 in the side support part 5 and supplying inflation gas to the airbag C1.

For example, a cylinder-type inflator having a cylindrical shape may be used as the inflator 30. A pair of upper and lower stud bolts 32 protrude inside in the vehicle width direction from the periphery of the inflator 30. These stud bolts 32 are attached (fastened) to the side frame 10 by nuts. A plurality of gas ejection holes aligned in the circumferential direction are formed in the inflator 30 and gas is radially ejected from these gas ejection holes. Meanwhile, a diffuser for controlling the flow of gas may be provided if needed.

An air bag control ECU (not illustrated) mounted on the vehicle is electrically connected to the inflator 30. A satellite sensor for detecting side collisions is electrically connected to the airbag control ECU. Furthermore, the inflator 30 can be configured so as to act if the airbag control ECU detects a side collision based on a signal from the satellite sensor.

As illustrated in FIG. 4, the airbag C1, C2 includes a first bag C1 having an inflator 30 housed therein, along with a second bag C2 deploying inside in the vehicle width direction of the first bag C1. A first inner vent hole V1-2 is formed in the boundary portion between the first bag C1 and the second bag C2 such that the second bag C2 is deployed by inflation gas flowing in from the first bag C1. During deployment of the airbag, inflation gas flows from the first bag C1 through the vent hole V1-2 to the second bag C2, as indicated by the broken line arrow, and is subsequently exhausted from an external vent hole VF formed at the front end of the second bag C2.

As illustrated in FIG. 3, an inclined part that is inclined so as to be lower at the front thereof than at the rear thereof when viewed from the vehicle width direction (lateral direction) is formed at the upper edge of the second bag C2. Furthermore, the front portion of the inclined part is located lower than the center line 14a extending in the longitudinal direction of the upper arm 14L of the occupant P seated in a vehicle seat and forms a first protection area 22 that slides in under the upper arm 14L (under the armpit) of the occupant P. Meanwhile, the rear portion of the inclined part of the second bag C2 is located higher than the center line 14a extending in the longitudinal direction of the upper arm 14L of the occupant P seated in the vehicle seat and forms a second protection area 20 for protecting the shoulder of the occupant P when the airbag C1, C2 deploys. Note that the range and proportion of the first protection area 22 and the second protection area 20 are preferably adjusted as appropriate in accordance with the type of vehicle on which the airbag device is mounted, the shape of the seat, etc.

As illustrated in FIG. 4, the side frame 10 may be molded from a resin or a metal and have an L-shaped cross-sectional shape or a U-shaped cross-sectional shape. The side frame 10 includes a frame sidewall portion 10a that extends along the vehicle travel direction when the horizontal cross section is viewed from above. Furthermore, as described above, the inflator 30 is fixed to the outside in the vehicle width direction of this frame sidewall portion 10a by the stud bolts 32.

Regarding the relationship between the first bag C1 and the second bag C2, the capacity of the second bag C2 is set so as to be greater than that of the first bag C1. Furthermore, as will be described in detail below, the first bag C1 deploys so as to abut between the second bag C2 and a side structure (the door trim or the like) 18 of the vehicle during the initial stage of deployment of the airbag. Here, by having the capacity of the first bag C1 small, the first bag C1 is quickly deployed by inflation gas output from the inflator 30 and can quickly fill the space between the vehicle seat (the side frame 10) and the side structure 18. Furthermore, the first bag C1 is adapted to deploy so as to abut between the second bag C1 and the side structure 18 before the second bag C2 fully deploys.

Furthermore, the first bag C1 is disposed such that the rear portion thereof overlaps the frame sidewall portion 10a when viewed from the vehicle side and is adapted to rapidly and surely deploy toward the outside in the vehicle width direction, using the frame sidewall portion 10a as the reaction force surface.

Airbag Deployment Operation

The operation of the side airbag device according to the present invention is described below. FIG. 5 and FIG. 6 are side views (A) and front views (B) illustrating the state of a deployed airbag device according to the present invention, wherein FIG. 5 illustrates the initial stage of deployment, while FIG. 6 illustrates the fully deployed state.

When the side airbag device is actuated by the occurrence of a vehicle side collision, inflation gas released from the inflator 30 flows into the first bag C1 and the second bag C2. During the initial stage of deployment of the airbag, the first bag C1 is fully deployed first, while the second bag C2 is in a partially deployed state, as illustrated in FIG. 5. At this time, the first bag C1 deploys so as to fill the gap between the second bag C2 and the door trim 18. Consequently, it is possible to surely and quickly transfer the pressure of the door trim 18 to the second bag C2 via the intermediately located first bag C1.

Subsequently, when the door trim 18 is deformed to penetrate the cabin (vehicle interior), the second bag C2 fully deploys and is pushed in toward the occupant side via the first bag C1, as illustrated in FIG. 6.

In this case, the first protection area 22 of the second bag C2 is located under the upper arm 14L of the occupant P and therefore moves under the upper arm 14L (under the armpit) of the occupant P in a sliding manner and lifts the upper arm 14L upward. This results in no possibility of the upper arm 14L being caught between the airbags C1, C2 and the chest of the occupant P, preventing a situation in which the chest of the occupant P is pressed by excessive pressure.

Meanwhile, the second protection area 20 of the second bag C2 is located above the upper arm 14L of the occupant P, preventing it from slipping under the upper arm 14L and continuing to protect the shoulder vicinity.

Second Example

FIG. 7 is a schematic view illustrating the deployed state of an airbag device according to a second example of the present invention, corresponding to the cross section along line A1-A1 in FIG. 3. The difference between this example and the first example illustrated in FIG. 4 is the structure of the second bag C2. That is, in this example, the second bag C2 is partitioned into front and rear portions to form a front chamber portion C2F and a rear chamber portion C2R. A partition panel 40 is disposed at the boundary between the front chamber portion C2F and the rear chamber portion C2R and a vent hole V2 is formed in a portion thereof.

In this example, inflation gas flowing out of the first bag C1 flows into the rear chamber portion C2R of the second bag C2, then flows into the front chamber portion C2F via the vent hole V2. Furthermore, the front chamber portion C2F is adapted to mainly form the first protection area 22, while the rear chamber portion C2R is adapted to mainly form the second protection area 20.

As described above, in this example, the rear chamber portion C2R of the second bag C2 deploys earlier, allowing it to quickly protect the shoulder of the occupant P during the initial stage of deployment of the airbag, in addition to being able to quickly restrain the lateral movement of the occupant. Meanwhile, the front chamber portion C2F deploys following the rear chamber portion C2R, allowing the upper arm 14 of the occupant P to be lifted at relatively gradual timing without rapidly flipping up the upper arm 14L of the occupant by the first protection area 22.

Third Example

A third example of the present invention is described below with reference to FIG. 8 to FIG. 11. Note that duplicate descriptions have been omitted as much as possible for the same or corresponding components as those of the first and second examples described above, as such components have similar structures and functions.

FIG. 8 is a schematic side view of a side airbag device according to the third example of the present invention, illustrating the state of a deployed airbag viewed from outside (from the door trim side) in the vehicle width direction. FIG. 9 is a schematic view illustrating the deployed state of the airbag device according to the third example of the present invention, corresponding to the cross section along line A3-A3 in FIG. 8.

The side airbag device according to this example includes an airbag C101, C102 that inflates and deploys, thereby restraining the occupant, along with an inflator 30 that is disposed inside in the vehicle width direction relative to the side frame 10 in the side support part 5 and supplies inflation gas to the airbag C101.

For example, a cylinder-type inflator having a cylindrical shape may be used as the inflator 30. A pair of upper and lower stud bolts 32 protrude inside in the vehicle width direction from the periphery of the inflator 30. These stud bolts 32 are attached (fastened) to the side frame 10 by nuts. A plurality of gas ejection holes aligned in the circumferential direction are formed in the inflator 30 and gas is ejected radially from these gas ejection holes. Further, a diffuser for controlling the flow of gas may be provided if needed.

An air bag control ECU (not illustrated) mounted on the vehicle is electrically connected to the inflator 30. A satellite sensor for detecting side collisions is electrically connected to the airbag control ECU. Furthermore, the inflator 30 can be configured so as to act if the airbag control ECU detects a side collision based on a signal from the satellite sensor.

Referring to FIG. 8, an inclined part that is inclined so as to be lower at the front thereof than at the rear thereof when viewed from the vehicle width direction (lateral direction) is formed at the upper edge of the second bag C102. Furthermore, the front portion of the inclined part is located lower than the center line 14a extending in the longitudinal direction of the upper arm 14L of the occupant P seated in a vehicle seat and forms a first protection area 122 that slides in under the upper arm 14L (under the armpit) of the occupant P. Meanwhile, the rear portion of the inclined part of the second bag C102 is located higher than the center line 14a extending in the longitudinal direction of the upper arm 14L of the occupant P seated in the vehicle seat and forms a second protection area 120 for protecting the shoulder of the occupant P when the airbag deploys. Note that the range and proportion of the first protection area 122 and the second protection area 120 are preferably adjusted as appropriate in accordance with the type of vehicle on which the airbag device is mounted, the shape of seat, etc.

As illustrated in FIG. 9, the airbag C101, C102 includes a first bag C101 having the inflator 30 housed therein and a second bag C102 deploying outside in the vehicle width direction of the first bag C101. A first inner vent hole V1-2 is formed in the boundary portion between the first bag C101 and the second bag C102 such that the second bag C102 is deployed by inflation gas flowing in from the first bag C101. During deployment of the airbag, inflation gas flows from the first bag C101 through the vent hole V1-2 to the second bag C102, as indicated by the broken line arrow, and is subsequently exhausted from an external vent hole VF formed at the front end of the second bag C102.

In the third example, similarly to the second example described above, the second bag C102 is partitioned into front and rear portions to form a front chamber portion C102F and a rear chamber portion C102R. Furthermore, a partition panel 140 is disposed at the boundary between the front chamber portion C102F and the rear chamber portion C102R, with two vent holes V2 (V2a, V2b) formed in a portion thereof.

In this example, inflation gas flowing out of the first bag C101 flows into the rear chamber portion C102R of the second bag C102, then flows into the front chamber portion C102F via the vent holes V2. Furthermore, the front chamber portion C102F is adapted to mainly form a first protection area 122, while the rear chamber portion C102R is adapted to mainly form a second protection area 120.

As described above, in this example, the rear chamber portion C102R of the second bag C102 deploys earlier, allowing it to quickly protect the shoulder of the occupant P during the initial stage of deployment of the airbag, in addition to quickly being able to restrain the lateral movement of the occupant. Meanwhile, the front chamber portion C102F deploys following the rear chamber portion C102R, thereby allowing the upper arm 14L of the occupant P to be lifted at relatively gradual timing without rapidly flipping up the upper arm 14L of the occupant by the first protection area 122.

Regarding the relationship between the first bag C101 and the second bag C102, the capacity of the second bag C102 is set so as to be greater than that of the first bag C101. Furthermore, as will be described in detail below, the first bag C101 deploys so as to slip under the armpit or under the upper arm 14L of the occupant P during the initial stage of deployment of the airbag. Here, by having the capacity of the first bag C101 small, it is possible for the first bag C101 to be instantaneously deployed by inflation gas output from the inflator 30 and to become a trigger for quickly lifting the upper arm 14L of the occupant. In other words, the upper arm 14L of the occupant P is slightly lifted by the first bag C101, making it easy for the second bag C102 to subsequently slip under the upper arm 14L.

FIG. 10 is a side view schematically illustrating the configuration of the airbag (in a deployed state) according to the third example of the present invention, wherein (A) is a view from the door side in the vehicle width direction, while (B) is a view from the occupant side. In this example, the first bag C101 deploys on the occupant side (inner side) and has a boot-like shape with the lower portion thereof protruding frontward, as illustrated in FIG. (B). The protruding lower portion 101a of the first bag C101 is preferably located near the waist of the occupant P when the airbag deploys.

Configuration of Airbag Panels

FIG. 11 is a perspective side view illustrating a panel structure of the airbag according to the third example of the present invention, wherein (A) is a view from the door side in the vehicle width direction, while (B) is a view from the occupant side. Note that in FIG. 11, the panels illustrated in FIG. 12 to FIG. 14 are all illustrated.

FIG. 12 is a plan view illustrating the panel structure of the airbag according to the third example of the present invention and illustrates a pair of left and right panels that constitute the second bag C102. The second bag C102 is formed into a bag shape by stitching the outer edges of left and right main panels 102a, 102b having the same shape. Furthermore, vent holes 122a, 122b, 122c leading to the first bag C101 are formed in the main panel 102b located on the occupant side (inner side, the first bag C101 side). Furthermore, holes 120a, 120b for forming the vent holes VF (FIGS. 9 and 10) are formed on the front edge side of the main panel 102b.

FIG. 13 is a plan view illustrating the panel structure of the airbag according to the third example of the present invention, wherein (A) and (B) illustrate a pair of left and right reinforcing panels 130a, 130b provided inside the second bag C102, while (B) illustrates a panel 140 partitioning the front and rear chambers of the second bag C102. The reinforcing panels 130a, 130b are respectively fixed inside the main panels 102a, 102b (FIG. 12) by stitching, with holes 134a, 134b formed in the reinforcing panel 130b located on the occupant side (inner side, the first bag C101 side) at locations corresponding to the holes 120a, 120b of the main panel 102b. Furthermore, vent holes 136a, 136b, 136c leading to the first bag C101 are formed in the reinforcing panel 130b located on the occupant side (inner side, the first bag C101 side). These vent holes 136a, 136b, 136c are adapted to overlap corresponding vent holes 122a, 122b, 122c formed in the main panel 102b.

The partition panel 140 is formed in a band-like shape and is stitched inside the reinforcing panels 130a, 130b with a lower portion thereof bent to protrude forward. Inner vents V2a, V2b (FIG. 9) are formed in the partition panel 140 at two upper and lower locations such that gas flows from the rear chamber portion C102R to the front chamber portion C102F of the second bag C102.

FIG. 14 is a plan view illustrating the panel structure of the airbag according to the third example of the present invention, wherein (A) and (B) are a pair of left and right sub-panels 110a, 110b constituting the first bag C101, while (B) is a reinforcing panel 110c stitched between the first bag C101 and the second bag C102. Of the two sub-panels 110a, 110b, the outer panel 110a is disposed on the second bag C102 side (outside), while the inner panel 110b is disposed on the occupant P side, with the pair of these panels 110a, 110b stitched at the outer edges thereof to be formed into a bag shape.

Furthermore, the sub-panels 110a, 110b have the same bilaterally symmetric shape and are formed into a boot-like shape, the lower portion of which protrudes frontward when deployed (FIG. 9). Three inner vents 120a, 120b, 120c communicating with the second bag C102 are formed in the outer panel 110a. Furthermore, holes 122a, 122b, 122c are also formed at corresponding locations of the reinforcing panel 110c.

Subsequently, in a state such that the vent holes 122a, 122b, 122c of the panel 102b constituting the second bag C102 (FIG. 12), the vent holes 136a, 136b, 136c formed in the reinforcing panel 130b (FIG. 13), the vent holes 120a, 120b, 120c of the panel 110a constituting the first bag C101 (FIG. 14(A)), and the vent holes 122a, 122b, 122c of the reinforcing panel 110c are all aligned with each other, the panels are overlapped and the periphery thereof is stitched (FIG. 11(B)). This allows inflation gas to flow from the first bag C101 into the second bag C102.

Meanwhile, diffuser panels 200a, 200b may be provided inside the second bag C102, as illustrated in FIG. 11. These diffuser panels 200a, 200b can be configured so as to direct the flow of gas released from the inflator 30, for example, in the vertical direction.

Airbag Deployment Operation

The operation of the side airbag device according to this example is described below. FIG. 15 and FIG. 16 are side views (A) and front views (B) illustrating the state of a deployed airbag device according to this example, wherein FIG. 15 illustrates the initial stage of deployment, while FIG. 16 illustrates the fully deployed state.

When the side airbag device is actuated due to the occurrence of a vehicle side collision, inflation gas released from the inflator 30 flows into the first bag C101 and the second bag C102. During the initial stage of deployment of the airbag, the first bag C101 fully deploys first, while the second bag C102 is in a partially deployed state, as illustrated in FIG. 15. At this time, the first bag C101 slides under the upper arm 14L of the occupant P to lift the upper arm 14 of the occupant. Specifically, the lower portion 101a of the first bag C101 comes in contact with the elbow (the lower portion of the upper arm) of the occupant to lift the upper arm 14L.

Subsequently, when the second bag C102 fully deploys, the first protection area 122 of the second bag 102C moves under the upper arm 14L (under the armpit) of the occupant P in a sliding manner and lifts the upper arm 14L further upward. This results in no possibility of the upper arm 14L being caught between the airbag C101, C102 and the chest of the occupant P, preventing a situation in which the chest of the occupant P is pressed by excessive pressure.

The second protection area 120 of the second bag C102 is located above the upper arm 14L of the occupant P, preventing it from slipping under the upper arm 14L and continuing to protect the shoulder vicinity.

As described above, in the third example of the present invention, it is possible for the first bag C101 to instantaneously deploy and become a trigger for quickly lifting the upper arm 14L of the occupant. In other words, the upper arm 14L of the occupant P is slightly lifted by the first bag C101, allowing the second bag C102 to smoothly enter under (slip under) the upper arm 14L and lift it more greatly.

Note that the first bag C101 includes the lower portion 101a protruding frontward in the third example described above, but does not necessarily include a region with such a shape. For example, when the first bag C1 without a portion protruding in the front-rear direction is employed as in the first and second examples, the first bag C1 can be configured such that the upper portion thereof slides under the vicinity of the armpit of the occupant P (upper arm root), thereby obtaining the same effect as that of the third example.

INTERPRETATION OF THE TECHNICAL SCOPE OF THE PRESENT INVENTION

While the present invention has been described in connection with the above exemplary embodiments, many equivalent changes and modifications will be apparent to those skilled in the art from the present disclosure. Accordingly, the above exemplary embodiments of the present invention are considered to be illustrative, but not limiting. Various changes can be made to the described embodiments without departing from the spirit and scope of the invention. For example, while in the Mode for Carrying Out the Invention, near-side side airbags were described in a focused manner, the invention is also applicable to far-side airbags (on the side face of the vehicle seat far from a vehicle door), single-seat vehicles in microcompact vehicles or the like, such as small mobility vehicles (vehicles including a portion in which there is only one seat per row, regardless of whether there is a door or not), and the like.

The invention claimed is:

1. A side airbag device for housing in a side support part of a vehicle seat, the side airbag device comprising:
   an airbag for restraining an occupant by inflating and deploying; and,
   an inflator for supplying inflation gas to the airbag;
   wherein:
   the airbag includes a first bag housing the inflator on an inside thereof which is capable of inflating and deploying, and a second bag capable of inflating and deploying on a side of the first bag;
   the second bag is configured so as to be deployed by inflation gas flowing in from the first bag;
   the second bag has an inclined part formed at an upper edge thereof and is inclined so as to be lower at a front thereof than at a rear thereof when viewed from a vehicle width direction (lateral direction);
   the inflator is disposed inside in the vehicle width direction relative to a side frame in the side support part;
   the second bag is deployable outside in the vehicle width direction of the first bag, and
   a capacity of the second bag is relatively greater than that of the first bag.

2. The side airbag device according to claim 1, wherein the first bag deploys between the second bag and the occupant during an initial stage of deployment of the airbag.

3. The side airbag device according to claim 2, wherein the first bag deploys so as to slide under an arm of the occupant during the initial stage of deployment of the airbag.

4. The side airbag device according to claim 1, wherein the first bag is configured so as to deploy utilizing a reaction force of the side frame.

5. The side airbag device according to claim 1, wherein a rear portion of the inclined part is located higher than a center line extending in a longitudinal direction of an upper arm of the occupant seated in the vehicle seat, thereby forming a second protection area for protecting a shoulder of the occupant when the airbag deploys.

6. The side airbag device according to claim 1, wherein a first inner vent hole is formed in a boundary portion between the first bag and the second bag.

7. The side airbag device according to claim 5, wherein:
the second bag is partitioned into a front chamber portion and a rear chamber portion;
the partitioned portions are configured so as to be provided with a second inner vent hole such that inflation gas flows from the rear chamber portion into the front chamber portion; and,
the front chamber portion is configured so as to form a first protection area, while the rear chamber portion is configured so as to form a second protection area.

8. The side airbag device according to claim 1, wherein the occupant is assumed based on a World Side Impact Dummy (W-SID).

9. The side airbag device according to claim 1, wherein a front portion of the inclined part is located lower than a center line extending in a longitudinal direction of an upper arm of the occupant seated in the vehicle seat, thereby forming a first protection area fitting in under the upper arm of the occupant.

10. A side airbag device housed in a side support part of a vehicle seat, the airbag device comprising:
an airbag for restraining an occupant by inflating and deploying;
and, an inflator for supplying inflation gas to the airbag; wherein:
the airbag includes a first bag housing the inflator on an inside thereof which is capable of inflating and deploying, and a second bag capable of inflating and deploying on a side of the first bag;
the second bag is configured so as to be deployed by inflation gas flowing in from the first bag;
the second bag has an inclined part formed at an upper edge thereof and is inclined so as to be lower at a front thereof than at a rear thereof when viewed from a vehicle width direction (lateral direction); and,
a front portion of the inclined part is located lower than a center line extending in a longitudinal direction of an upper arm of the occupant seated in the vehicle seat, thereby forming a first protection area for fitting in under the upper arm of the occupant,
wherein the airbag is shaped such that a capacity of the second bag is relatively greater than that of the first bag.

11. A side airbag device for housing within a side support part of a vehicle seat, the side airbag device comprising:
a side frame including a frame sidewall portion for extending in a direction of vehicle travel;
an airbag for restraining an occupant by inflating and deploying, the airbag including a first bag and a second bag arranged for inflating and deploying on a laterally inner side of the frame sidewall portion; and,
an inflator within the first bag for supplying inflation gas to the airbag, the inflator mounting to the frame sidewall portion and extending from a laterally outer side of the frame sidewall portion in an outward direction, wherein:
the second bag is configured so as to be deployed by inflation gas flowing in from the first bag;
the second bag has an inclined part formed at an upper edge thereof and is inclined so as to be lower at a front thereof than at a rear thereof when viewed in a lateral direction); and,
a front portion of the inclined part is configured to be located lower than a center line extending in a longitudinal direction of an upper arm of an occupant seated in the vehicle seat, thereby forming a first protection area configured to fit in under the upper arm of the occupant,
wherein a rear portion of the inclined part is configured to be located higher than the center line extending in the longitudinal direction of the upper arm of the occupant seated in the vehicle seat, thereby forming a second protection area for protecting a shoulder of the occupant when the airbag deploys.

12. The side airbag device according to claim 11, wherein the first bag has a further inclined part formed at a further upper edge thereof and is inclined so as to be lower at a further front thereof than at a further rear thereof when viewed in the lateral direction.

13. The side airbag device according to claim 12, wherein the inclined part of the second bag is longitudinally forward of the further inclined part of the first bag upon inflation and deployment of the a airbag.

14. The side airbag device according to claim 11, wherein the first bag deploys so as to abut between the second bag and a side structure of a vehicle during an initial stage of deployment of the airbag.

15. The side airbag device according to claim 14, wherein the first bag deploys so as to abut between the second bag and the side structure prior to the second bag fully deploying.

16. The side airbag device according to claim 11, wherein the first bag is configured so as to deploy between the side frame and a side structure, utilizing a reaction force of the side frame, during an initial stage of deployment of the airbag.

17. A side airbag device for housing within a side support part of a vehicle seat, the side airbag device comprising:
a side frame including a frame sidewall portion for extending in a direction of vehicle travel;
an airbag for restraining an occupant by inflating and deploying, the airbag including a first bag and a second bag arranged for inflating and deploying on a laterally inner side of the frame sidewall portion; and,
an inflator within the first bag for supplying inflation gas to the airbag, the inflator mounting to the frame sidewall portion and extending from a laterally outer side of the frame sidewall portion in an outward direction, wherein:
the second bag is configured so as to be deployed by inflation gas flowing in from the first bag,
the second bag has an inclined part formed at an upper edge thereof and is inclined so as to be lower at a front thereof than at a rear thereof when viewed in a lateral direction),
a front portion of the inclined part is configured to be located lower than a center line extending in a longitudinal direction of an upper arm of an occupant seated in the vehicle seat, thereby forming a first protection area configured to fit in under the upper arm of the occupant, and
both of the first bag and the second bag overlap a forward end of the frame sidewall portion in the lateral direction upon inflation of the first and second bags.

* * * * *